E. A. WALL.
ROLL ADJUSTING MECHANISM.
APPLICATION FILED NOV. 8, 1913.
1,088,116.
Patented Feb. 24, 1914.
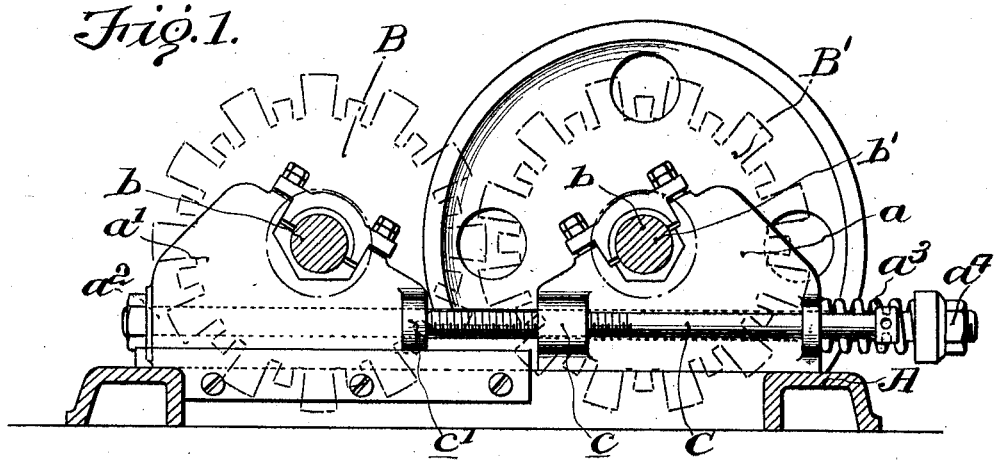
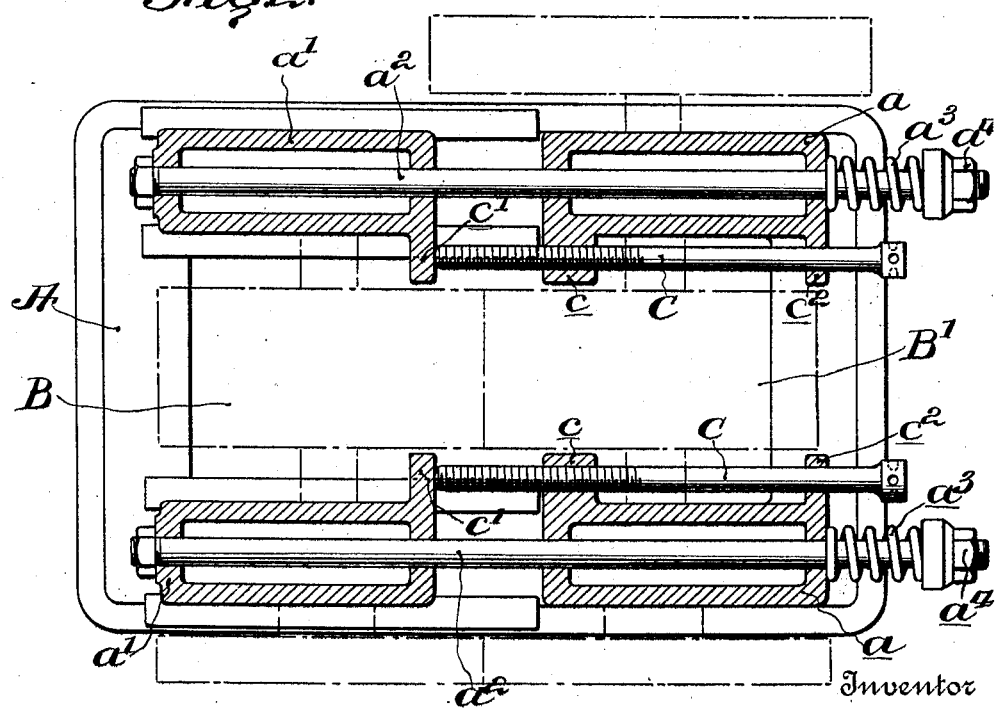
Witnesses
Inventor
Enos A. Wall
By Geo. U. Evans
Attorney

UNITED STATES PATENT OFFICE.

ENOS A. WALL, OF SALT LAKE CITY, UTAH.

ROLL-ADJUSTING MECHANISM.

1,088,116.  Specification of Letters Patent.  Patented Feb. 24, 1914.

Application filed November 8, 1913. Serial No. 799,938.

*To all whom it may concern:*

Be it known that I, ENOS A. WALL, a citizen of the United States, residing at Salt Lake City, in the county of Salt Lake and State of Utah, have invented certain new and useful Improvements in Roll-Adjusting Mechanism, of which the following is a specification.

My invention relates to grinding and crushing rolls, one of which is spring pressed.

The main object of the invention is to provide adjusting devices for limiting the movement of the spring pressed roll toward the fixedly supported roll without the necessity of stopping the rotation of the rolls.

A further object of the invention is to provide a pair of longitudinally adjustable threaded stop or adjusting rods the inner ends of which engage abutments on the movable bearings of the spring pressed roll to limit its movement toward the other roll, the outer exposed ends of the said stop or adjusting rods being their operating ends and permitting of their operation by a suitable tool so that the limit of sliding movement of the yielding roll may be set without stopping the machine.

These objects I accomplish by the construction shown in the accompanying drawing, in which:

Figure 1 is a sectional side elevation of a pair of rolls with my improved adjusting devices applied. Fig. 2 is a sectional plan thereof.

A designates the frame or bed of the machine having the fixed bearings $a$ and the sliding bearings $a'$.

B is the yielding roll mounted in the sliding bearings $a'$ and B' is the opposed roll mounted in the fixed bearings $a$. These rolls B B' may be of suitable form for the crushing or grinding action, but are shown like the rolls in my Patent 1,044,833, November 19, 1912. The rolls may be operated by any suitable driving mechanism, not shown, from their shafts $b$ $b'$. The yielding roll B is drawn toward the opposed roll B' by means of the tension springs $a^3$ mounted on the ends of the tension rods $a^2$ which extend from the sliding bearings $a'$ through the fixed bearings $a$. The springs $a^3$ are on the outer exposed ends of the rods $a^2$ and their tension is regulated by the nuts $a^4$ on the extremities of said rods, as is commonly done. Parallel with the pair of tension rods $a^2$ is a pair of stop or adjusting rods C and these rods C are threaded at their inner ends and there mounted in nuts $c$ $c$ formed on the inner ends of the fixed bearings $a$ so that by rotating the rods C they will be moved longitudinally to bring their inner ends nearer to or farther from two abutments $c'$ $c'$ on the sliding bearings $a'$. The stop or adjusting rods C also pass through two guide lugs $c^2$ $c^2$ formed on the fixed bearings $a$, while just beyond these lugs $c^2$ the outer ends of the stop rods are formed for operation by a suitable tool; openings being shown to receive a spanner or pin.

It will be seen that by slacking up on the rods C as the rolls wear down the roll B will be allowed to approach closer to the roll B', or by setting up on the rods C the roll B may be held away from roll B' when it is desired to space the rolls farther apart for a coarser product. The stop or adjusting rods C may be adjusted at any time to change the spacing of the rolls without stopping the machine or in any way affecting the tension mechanism, and the usual spacing blocks are entirely done away with.

What I claim is:

1. The combination with the yielding roll, its sliding bearings having lateral lugs, tension rods on which said bearings slide, springs on the outer ends of the rods, and nuts for adjusting the tension thereof, of a pair of stop or adjusting rods threaded into the said lateral lugs with their inner ends abutting said stop lugs and their outer ends provided with operating means; whereby the tension springs and stop rods may be adjusted at the same end of the sliding bearings.

2. The combination with the longitudinally bored fixed and movable roll bearings, of tension rods extending through said longitudinal bores and fixed with respect to the stationary bearings, tension springs and adjusting nuts on the outer ends of the tension rods beyond the movable bearings, threaded lugs projecting toward each other from the inner sides of the movable bearings, stop lugs projecting toward each other from the inner sides of the fixed bearings, and stop rods extending inwardly through the threaded lugs with their inner ends abutting said stop lugs and their outer operating ends at the same end of the machine as said tension adjusting nuts.

3. The combination with the fixed and movable roll bearings, of the tension rods, their tension springs and nuts operable at one end of the machine, and stop rods limiting the movement of the movable bearings toward the fixed bearings and having operating heads at the same end of the machine as the said tension adjusting nuts.

In testimony whereof I affix my signature in presence of two witnesses.

E. A. WALL.

Witnesses:
A. M. PARKINS,
GEO. H. EVANS.

Copies of this patent may be obtained for five cents each, by addressing the "Commissioner of Patents, Washington, D. C."